United States Patent [19]

Heath

[11] 4,408,498

[45] Oct. 11, 1983

[54] TURBINE FLOW METERS

[75] Inventor: James H. Heath, Wareham, England

[73] Assignee: United Kingdom Atomic Energy Authority, London, England

[21] Appl. No.: 247,400

[22] PCT Filed: Aug. 1, 1980

[86] PCT No.: PCT/GB80/00123

§ 371 Date: Mar. 25, 1981

§ 102(e) Date: Mar. 25, 1981

[87] PCT Pub. No.: WO81/00453

PCT Pub. Date: Feb. 19, 1981

[30] Foreign Application Priority Data

Aug. 6, 1979 [GB] United Kingdom ............... 7927310
Dec. 13, 1979 [GB] United Kingdom ............... 7943051

[51] Int. Cl.³ .............................................. G01F 1/10
[52] U.S. Cl. ............................ 73/861.79; 73/861.02; 73/861.89
[58] Field of Search .......... 73/861.01, 861.02, 861.03, 73/861.04, 861.35, 861.77, 861.78, 861.83, 861.84, 861.89, 861.91, 861., 92, 861.93, 861.94

[56] References Cited

U.S. PATENT DOCUMENTS

| 720,188 | 2/1903 | Seidener | 73/861.01 |
| 3,115,777 | 12/1963 | Hochreiter | 73/861.02 |
| 3,811,323 | 5/1974 | Swenson | 73/861.83 |
| 4,164,866 | 8/1979 | Mitchell et al. | 73/861.77 |

FOREIGN PATENT DOCUMENTS 323659 2/1972 U.S.S.R. ............... 73/861.83

Primary Examiner—Charles A. Ruehl
Attorney, Agent, or Firm—Larson and Taylor

[57] ABSTRACT

A turbine flow meter (1) of the kind in which a bladed rotor (14,53) is rotated by the flow about an axis lying in the general direction of the flow. The length of the blades (13, 54) does not exceed 0.3 of the radius to the blade tips, each blade being twisted over its length in proportion to its radius. The maximum twist is such that at no point is the angle relative to the rotational axis greater than fifteen degrees. No visible clear path exists through the area of the blades for the fluid. A force transducer (56, 57, 63) is mounted in the fluid flow path to enable a measurement of momentum to be provided so that in conjunction with a measure of the speed of rotation of the rotor, the mass flow rate of the fluid can be deduced.

10 Claims, 7 Drawing Figures

U.S. Patent   Oct. 11, 1983   Sheet 1 of 2   4,408,498
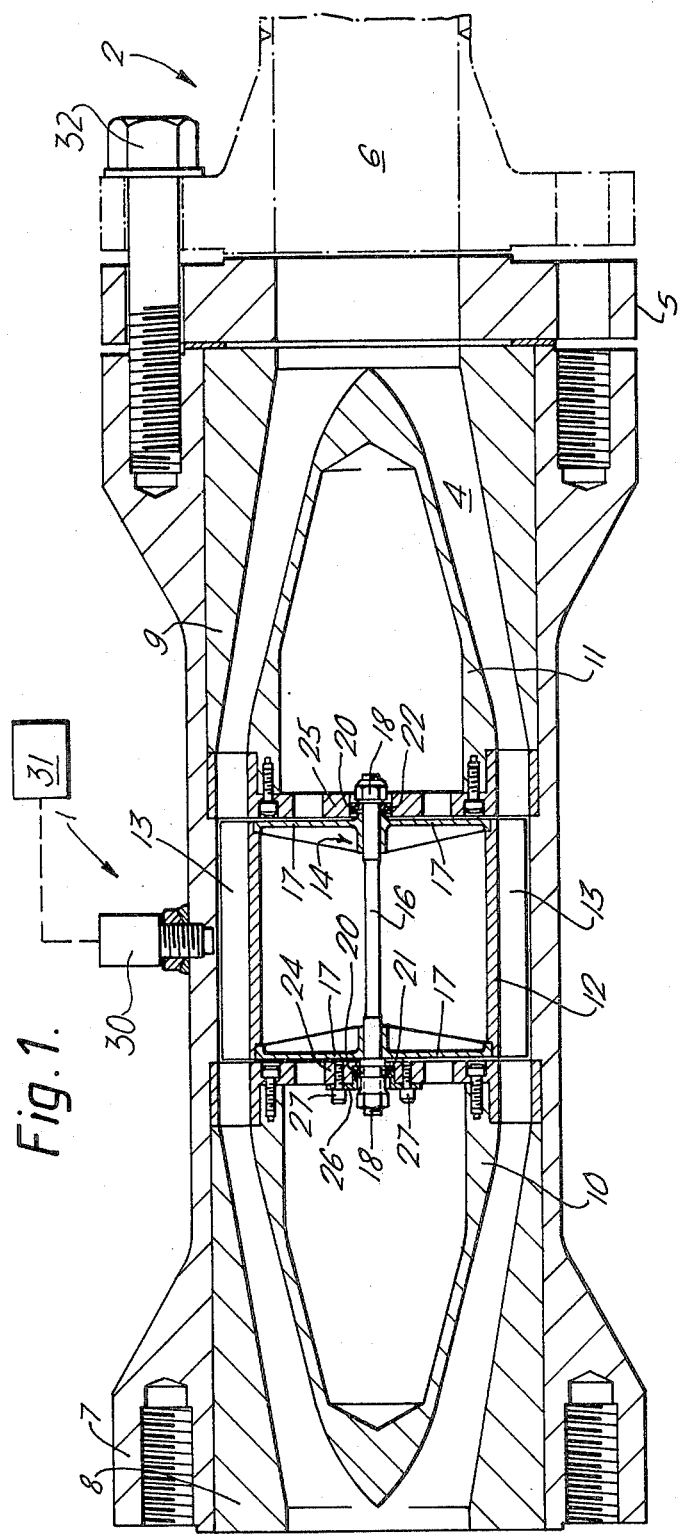
Fig.1.
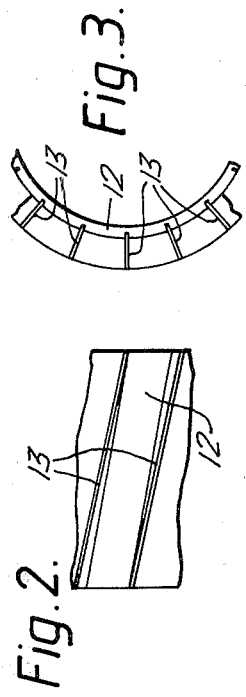
Fig.2.
Fig.3.

TURBINE FLOW METERS

This invention relates to turbine flow meters.

A turbine flow meter comprises a multi-bladed rotor which runs between bearings and is situated in a flow conduit. The transducer which is located in a wall of the flow conduit senses passage of the blades on the rotor. The rotor has a speed of rotation which is to some extent proportional to the flow rate of fluid passing through the conduit.

A problem with known turbine flow meters is that they tend to become inaccurate when used to measure flow of 2 phase fluids, e.g. mixtures of steam/water, gas/oil and air/water. A similar problem arises with oil/oil mixtures of different densities owing to, for example, different temperatures of constituents. An object of the present invention is to mitigate the above problem by providing a turbine flow meter which tends to measure flow of mixed fluids more accurately than hitherto.

According to the present invention, a turbine flow meter comprises a rotatably mounted multi-bladed rotor arrangement in a housing insertable in a flow conduit, said rotor arrangement comprising a boss and a number of blades attached to the boss, the boss diameter and blade outside diameter having a ratio of not less than 7 to 10, the rotor blades being disposed in respect of the rotational axis at an angle proportional to blade radius. The ratio is provided in order to enhance the immunity of the turbine flow meter to nonuniform flow. The blades are angled in order that the speed of points on the blade can be matched to flow rate. Preferably, the rotor blade angle is not greater than fifteen degrees at the tip.

Preferably, the housing is arranged such that the cross-sectional area of fluid flowing through the flow meter is substantially the same as the cross-sectional area of the conduit. In this way, distortions to the fluid flow profile by the flow meter are retained at a minimum. Advantageously, clearance between the tips of the rotor blades and the housing is less than one half percent of the diameter of the rotor arrangement. It is found that provision of such a clearance increases the immunity of the flow meter to nonuniform flow.

Preferably, the rotor arrangement is manufactured to have a visible clear path therethrough as close as possible to zero. In this way, the rotating rotor arrangement can see all of the flow which passes through it. Advantageously, the rotor arrangement has an odd number of blades. Provision of an odd number of blades is useful because it enables an electronic logic circuit to determine the direction of rotation of the rotor arrangement.

Preferably, a force transducer is arranged within the fluid flow path. Provision of the force transducer enables the turbine flow meter to be used to measure mass flow of fluids within the conduit. Conveniently, the force transducer comprises a drag disc. Advantageously, the drag disc has a number of equi-spaced spokes attached to a center ring. The spokes may be of conical formation. Preferably, the spokes obstruct no more than twenty-five percent of the cross-sectional area of the fluid flow conduit.

According to another aspect of the present invention, a turbine flow meter of the kind in which a bladed rotor is rotated by the flow about an axis lying in the general direction of the flow, is characterized by the combination that the blade length does not exceed 0.3 of the radius to the blade tips, that each blade over its length is twisted (substantially without alteration of profile) in proportion to radius but such that at no point is the angle relative to the rotational axis grater than fifteen degrees, that the dimension of the blades in the direction of the rotational axis is sufficient for the entry and exit edges to be at least coincident so that no visible clear path pertains anywhere through the blades area, and that the blade tips are closely proximate to the interior surface of a housing accommodating the rotor, there being also included in the combination a force transducer which is elastically deflectable by the flow to provide a measure of the momentum enabling, in conjunction with a measure of the speed of rotation of the rotor, the mass flow rate of the fluid to be deduced.

Two embodiments of the present invention will now be described by way of example only with reference to the accompanying drawing in which:

FIG. 1 is a vertical section through a turbine flow meter and part of the fluid conduit in accordance with the first embodiment of the invention.

FIG. 2 is a scrap view of a rotor shown in FIG. 1,

FIG. 3 is a further scrap view showing a different part of the rotor,

Figure 4:
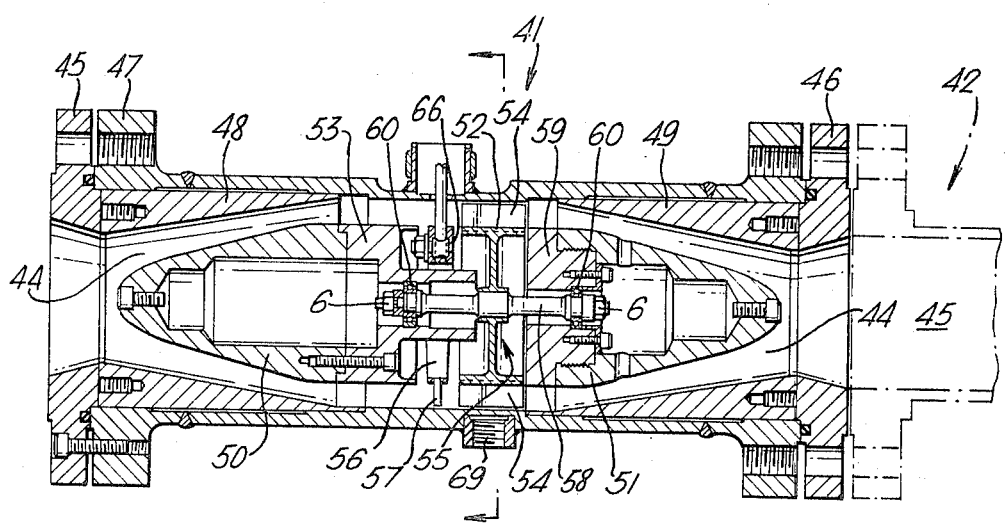
FIG. 4 is a vertical section through a turbine flow meter and part of a conduit according to the second embodiment.

Reference is directed firstly to FIG. 1, wherein a first embodiment of turbine flow meter is generally indicated by 1 and a fluid flow conduit by 2. Fluids flow from left to right of the figure in through an annular channel 4 of constant area but of increasing, constant and then descreasing outside diameter in the flow meter and thence to the conduit 2 via a joint member 5. The conduit 2 contains a cylindrical flow passage 6.

The annular channel 4 of the flow meter is defined on its outer radial side by a housing 7 of the flowmeter. Leftwards the housing 7 has a portion 8 with increasing inner diameter towards the middle of the flow meter. In the middle, the housing is of constant internal diameter and to the right, a portion 9 is provided which is a mirror image of the portion 8.

On its inner radial side, the annular channel 4 is defined by generally conical members 10, 11 to the left and right of the middle, which members are mirror images of one another, and to the middle by a cylindrical drum or boss 12. Typically, the boss 12 carries 29 blades or vanes 13 of metallic material, only 2 of which blades are shown in FIG. 1. The drum is part of a rotor arrangement 14 which is described in more detail below.

The dimensions of the housing 7, members 10, 11 and boss/blades 12, 13 are so selected that the cross sectional area of the channel 4 remains substantially constant along the flow path and is substantially equal to the cylindrical flow passage 6. Thus, at the apex of the members 10, 11 the channel 4 has a cross-sectional are equal to that of the passage 6 and the radius of the members 10, 11 increases more quickly than the internal radius of the housing 8 towards the middle of the flow meter; in the vicinity of the boss 12 the annular cross-section between the drum and housing is equal to the cross-section of passage 6 plus the cross-sectional area of the blades 13.

The rotor arrangement 14 is now described in more detail. The boss 12 is supported on an axial shaft 16 via closure members 17. The shaft 16 is rotatably mounted in ball bearings 20 at either end thereof and secured by nuts 18. The outer races 21, 22 of the ball bearings are secured to spiders 24, 25 respectively by flanges 26 and screws 27. The spiders 24,25 are utilized to secure the rotor arrangement together with the members 10, 11 to the housing 7 of the meter.

Reference is now made to FIG. 2, which shows a scrap view of the boss 12 and 2 of the blades 13 looking towards the drum axis. From this figure, it can be seen that the angle of the blades with respect to the axis increases away from the boss. In fact, the rotor blade angle at any point is constructed to be proportional to the radius of the blade at that point, typically a 14 degree angle being provided at the blade tip. Also, the roots of the blades are disposed in a helical fashion around the boss 12. Reference is now made to FIG. 3 which is an incomplete view of the boss 12 and blades 13 looking along the axis of the boss and which shows the attachment of the blades to the boss. For the sake of simplicity, the blades are shown radially disposed and the twist mentioned above in connection with FIG. 2 is now shown. However, it is to be understood that the attachment is as shown in FIG. 2 for the reasons explained in connection with that figure.

Reference is now made again to FIG. 1 wherein a detecting transducer is shown at 30. The transducer 30 detects passage of the blades of the rotor arrangement, thereby to enable the rotational speed of the rotor to be determined. Another similar transducer (not shown) is arranged in the housing 7 at right-angles to the transducer 30 around the rotor axis. The other transducer enables the direction of rotation of the rotor arrangement 14 to be determined by electrical logic or other sequential analysis means 31. The fact that there are an odd number of blades, in this case 29, on the boss enables the direction to be determined.

Theoretical analysis to be explained in more detail below has been applied to determine the flow properties of 2 phase fluid such as water/steam, gas/oil mixtures or oil/oil mixtures having constitutents which are at a different temperature. Turbine rotor speed in 2 phase mixtures is dependent upon the densities, proportions and velocity of the fluids involved in providing a vector fluid flow velocity output signal. Errors caused by unequal disstribution of 2 phases in a fluid flow conduit are minimized by the present invention which has a ratio for the boss 12 to blades 13 of 7.5:10. It is found that this ratio should not be less than 7:10, the radii being measured from the rotor axis. The blade/boss relationship tends to achieve uniformity of distribution of the phases in a 2 phase flow. Clearance between the tips of the rotor blades 13 and the housing 7 is less than one half percent of rotor arrangement diameter, this clearance tends to minimize the effect of non-uniformity in the flow, although at first sight it might appear that a gap of zero would be more advantageous. As was explained above, the roots of the blades are arranged on the boss in a generally helical manner and the angle of the blades with respect to the rotational axis is proportional to blade radius. This latter relationship enables speed of points on the turbine to be matched to the flow. The rotor blade angle at the tip is not more than fifteen degrees, this being found to be the upper limit for such matching. The visible clear path through the blades 13 in the direction of fluid flow is as small as possible and ideally zero. Since there is no window, the turbine sees all of the flow. As was explained above, since there are an odd number of blades, the electrical logic 31 can determine in which direction the turbine is rotating. The turbine flow meter does not require a substantial length of straight conduit (about 10 or more times the inlet conduit diameter) on its inlet or outlet side, being unaffected by flow distribution.

In operation, the turbine flow meter 1 is inserted between 2 conduit parts such as 2 and secured thereto by joint members 5 via bolts 32. Two phase flow can then occur between the conduit such as 2 either from left to right or right to left, through channel 4. The direction of fluid flow and mean velocity is determined by the direction of rotation of the rotor arrangement 14 and the speed of rotation. The transducers 30 derive signals indicative of the number of blades passing them which number is proportional to the speed, the sequence of the signals depending on direction. The processor 31 provides a signal indicative of flow rate and direction. Owing to the structure of the flow meter, i.e. the constant cross-section flow of fluid and the other parameters referred to above, uneven distribution of the 2 phases of the fluid does not tend to cause faulty speed readings.

Reference is now directed to FIG. 4, wherein a second embodiment of turbine flow meter is generally indicated by 41 and a fluid flow conduit by 42. Fluids flow from right to left of the figure, entering through an annular channel 44 of constant area but of increasing, constant and then decreasing outer diameter in the flow meter. Flow into the flow meter section is from the conduit 42 which contains a cylindrical flow passage 45. A retaining plate 46 is connected between the conduit and the flow meter.

The annular channel 44 in the flow meter is defined on its outer radial side by housing 47 of the flow meter. To the left, the housing 47 has a portion 48 with increasing inner diameter towards the middle of the flow meter. The middle, the housing is of constant internal diameter and to the right a portion 49 is provided which is a mirror image of the portion 48.

The annular channel 44 is defined on its inner radial side by generally conical members 50, 51 to be left and right of the middle, which members are mirror images one of another, and in the middle by a cylindrical drum or boss 52 and a support spider 53. The boss 52 carries typically 29 blades or vanes 54 of metallic material, only 2 of which blades are shown in FIG. 1 and the boss is part of a rotor arrangement 55.

The housing 47, members 50, 51 and boss/blades 52, 54 are so constructed that the cross-sectional area of the channel 44 remains substantially constant along the flow path, being substantially equal to the cylindrical flow passage 45. Thus, at the apex of the members 50, 51 the channel 44 has a cross-sectional area equal to that of passage 45 and the radius of the members 50, 51 increases more quickly than the internal radius of housing 48 towards the middle of the flow meter, in the vicinity of the boss 52 the annular cross-section between the boss and housing is equal to the cross-section of passage 45 plus the cross-sectional area of the blades 54.

A drag disc 56 is associated with the support spider 53 and the drag disc carries spokes 57 which have a radial length equal to the radial length of the turbine blades 54. The rotor arrangement 55 is now described in more detail. The drum 52 is supported on an axial shaft 58 via spider members 59 and 53. The shaft 58 is rotatably mounted in bearings 60 at either end thereof and secured by nuts 61.

Figure 5:
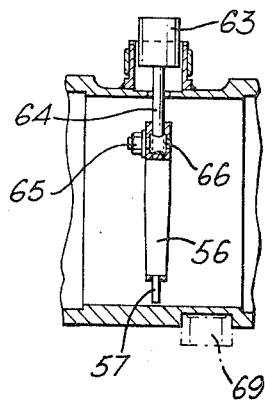
FIG. 5 is an incomplete view of part of FIG. 4.
Figure 6:
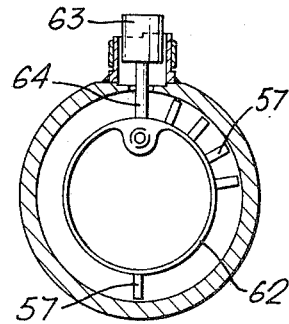
FIG. 6 is a sectional view looking along VI—VI in FIG. 5 and, FIG. 7 is a similar view to FIG. 6, but looking along VII—VII of FIG. IV.

Reference is now made to FIGS. 5 and 6, wherein the drag disc 56 is shown in more detail. The drag disc comprises an annulus 62 for supporting the spokes 57, through which annulus the shaft 58 and spider boss 53 can pass. The annulus is connected to a force transducer 63 via a tie rod 64. The tie rod is connected to the annulus by a nut 65 and stud 66. The force signal from transducer 63 is fed to a micro-processor 80.

Figure 7:
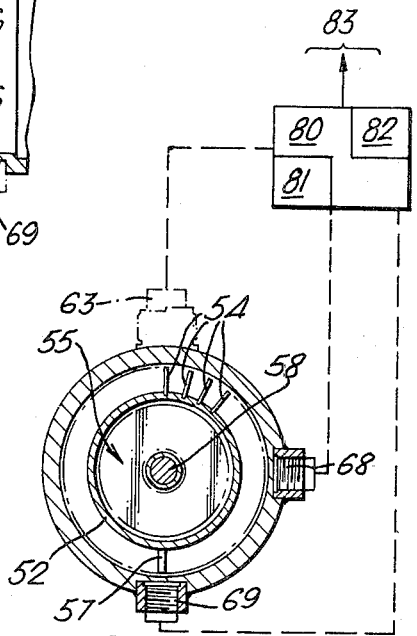

Reference is now directed to FIG. 7, in which the rotor arrangement 55 is partly shown and where transducers 68, 69 for detecting passage of the blades 54 and thus rotation speed of the rotor can be seen. The signal from transducers 68, 69 are fed to the micro-processor 80 may be controlled through a keyboard 81 and may have a display 82 for calculated value. Alternatively, or additionally, the micro-processor may produce a process control output 83. Operation of the turbine flow meter is now described with reference to FIGS. 4 to 7. The turbine flow meter including the drag disc is suitable for determining mass flow of multi-phase fluid, i.e. where there is non-uniform flow of fluid in a channel, for example, a one constitutent fluid with velocity or density variations or a many constituent fluid of different substances each with its own velocity. A multi-phase flow may include any single constituent flow that is not homogenous in all respects. The rotor arrangement 55 is caused to rotate by passage of the fluid and the rotational speed is proportional to the total momentum of the moving fluid divided by the total mass of moving fluid.

The spokes 57 of the drag disc cover up to twenty-five percent of the flow path, if they were to cover any more the pressure drop across the drag disc could cause significant error. The spokes, which are conical, have a cone diameter at any plane proportional to their distance from the central axis of the meter and divide the flow path into equal areas. The annulus 62 is for support only and does not extend into the flow path. The drag disc 56 moves under the action of the multi-phase flow and the movement is proportional to the total momentum of the moving fluids. It will be appreciated that the mounting of the drag disc through the tie-rod 64 is elastic. Consequently, when the instantaneous signal from the force transducer 63 is divided by the instantaneous signal from the transducers 68, 69 the result is proportional to total mass flow. Instantaneous signals are used in order to avoid problems which may be associated with signals derived over a period. That is because force is rate of change of momentum and an instantaneous signal takes out any problem that might be associated with the rate.

The necessary calculations are carried out in the micro-processor 80 in response to instructions keyed in through the keyboard 81. The result of the calculation is displayed on the display 82 and can in some applications be transmitted in a process control function along a line 83 so that a process is controlled in a closed loop according to mass flow.

Mass flow can be measured for all distributions including density variations and velocity distributions of the fluid constituents. The mass flow meter may therefore be used where temperature variations exist across the flow channel, for example in large pipes carrying oil in a hot climate.

The drag disc 56 is preferably placed downstream of the rotor, but it can be placed upstream. Hence there are 2 transducers 68, 69 so that the direction of fluid flow may be sensed.

The mass flow meter has a fast response time so that it is usefully employed in situations where pipes may be fractured or broken so that fluid loss can be determined.

From the above description, it can be seen that an improved turbine flow meter is provided.

I claim:

1. A turbine flowmeter for two-phase fluid flow, comprising a rotatably-mounted multi-bladed single rotor insertable in a flow conduit, the rotor being mounted in a housing and comprising a boss and a number of blades attached to the boss, the ratio of boss diameter to blade outside diameter being not less than seven to ten, the rotor blades being disposed in respect of the rotational axis at an angle proportional to blade radius and not greater than 15° at the tip.

2. A turbine flowmeter, as claimed in claim 1, in which cross-sectional area of fluid flowing through the flowmeter is substantially the same as the cross-sectional area of the conduit.

3. A turbine flowmeter, as claimed in claim 1, in which clearance between the tips of the rotor blades and the housing is less than one-half percent of the diameter of the rotor.

4. A turbine flowmeter, as claimed in claim 1, in which the rotor is manufactured to have a visible clear path therethrough as close as possible to zero.

5. A turbine flowmeter, as claimed in claim 1, in which the rotor has an odd number of blades.

6. A turbine flowmeter, as claimed in claim 1, in which a force transducer is arranged within the fluid flow path.

7. A turbine flowmeter, as claimed in claim 6, in which the force transducer comprises a drag disc.

8. A turbine flowmeter, as claimed in claim 7, in which the drag disc comprises a number of equally-spaced spokes attached to a center ring.

9. A turbine flowmeter, as claimed in claim 8, in which the spokes are of conical formation.

10. A turbine flowmeter, as claimed in claim 8, in which the spokes obstruct no more than twenty-five percent of the fluid flow conduit.

* * * * *